(12) United States Patent
Kim (10) Patent No.: US 9,229,491 B2
(45) Date of Patent: Jan. 5, 2016

(54) TABLET COMPUTER

(71) Applicant: Han Soo Kim, Seoul (KR)

(72) Inventor: Han Soo Kim, Seoul (KR)

( * ) Notice: Subject to any disclaimer, the term of this patent is extended or adjusted under 35 U.S.C. 154(b) by 79 days.

(21) Appl. No.: 14/155,529

(22) Filed: Jan. 15, 2014

(65) Prior Publication Data

US 2015/0070834 A1 Mar. 12, 2015

(30) Foreign Application Priority Data

Sep. 6, 2013 (KR) .......................... 10-2013-0107121

(51) Int. Cl.
*G06F 1/16* (2006.01)

(52) U.S. Cl.
CPC ............ *G06F 1/1698* (2013.01); *G06F 1/1632* (2013.01); *G06F 1/1656* (2013.01)

(58) Field of Classification Search
CPC ...................................................... G06F 1/1698
See application file for complete search history.

(56) References Cited

U.S. PATENT DOCUMENTS

| | | | | |
|---|---|---|---|---|
| 5,625,673 | A * | 4/1997 | Grewe et al. ................ | 455/556.2 |
| 5,873,045 | A * | 2/1999 | Lee et al. .................... | 455/556.2 |
| 5,907,815 | A * | 5/1999 | Grimm et al. ................. | 455/557 |
| 6,538,880 | B1 * | 3/2003 | Kamijo et al. .............. | 361/679.4 |
| 6,961,237 | B2 * | 11/2005 | Dickie ..................... | 361/679.04 |
| 6,999,792 | B2 * | 2/2006 | Warren .......................... | 455/557 |
| 7,221,961 | B1 * | 5/2007 | Fukumoto et al. ............ | 455/557 |
| 7,266,391 | B2 * | 9/2007 | Warren .......................... | 455/557 |
| 8,072,392 | B2 * | 12/2011 | Lection .......................... | 345/1.1 |
| 8,260,348 | B2 * | 9/2012 | Sherman ..................... | 455/556.1 |
| 8,340,721 | B2 * | 12/2012 | Moran et al. .................. | 455/557 |
| 8,543,160 | B2 * | 9/2013 | Hung .......................... | 455/556.1 |
| 8,654,095 | B1 * | 2/2014 | Cho et al. ....................... | 345/173 |
| 8,787,016 | B2 * | 7/2014 | Rothkopf et al. ........ | 361/679.55 |
| 8,804,324 | B2 * | 8/2014 | Bohn et al. ............... | 361/679.27 |
| 8,842,429 | B2 * | 9/2014 | Ahn et al. ................. | 361/679.41 |
| 8,868,075 | B2 * | 10/2014 | Sherman et al. .............. | 455/436 |
| 8,918,144 | B2 * | 12/2014 | Shu .................. | 455/558 |
| 8,988,876 | B2 * | 3/2015 | Corbin et al. ............ | 361/679.58 |
| 9,014,756 | B2 * | 4/2015 | Zhuang et al. ................ | 455/558 |
| 2008/0026794 | A1 * | 1/2008 | Warren ......................... | 455/557 |
| 2008/0273297 | A1 * | 11/2008 | Kumar .......................... | 361/680 |
| 2009/0147758 | A1 * | 6/2009 | Kumar .......................... | 370/338 |
| 2011/0102344 | A1 * | 5/2011 | Chang et al. .................. | 345/173 |
| 2011/0102348 | A1 * | 5/2011 | Moran et al. .................. | 345/173 |
| 2012/0093205 | A1 * | 4/2012 | Crohas et al. ................. | 375/222 |
| 2013/0016483 | A1 * | 1/2013 | Chuang et al. ................ | 361/728 |
| 2014/0240241 | A1 * | 8/2014 | Moradian ..................... | 345/173 |

* cited by examiner

*Primary Examiner* — Lisa Lea Edmonds
(74) *Attorney, Agent, or Firm* — LRK Patent Law Firm (57) ABSTRACT

A tablet computer includes a mobile phone mounting portion which has determined width and length and is formed in the rear of the tablet computer in a recessed manner, guide grooves which are longitudinally formed on both lateral walls of the mounting portion, and a separation prevention member which is fixedly inserted into the guide grooves and has width and length corresponding to those of the mounting portion. The separation prevention member includes wing fixing portions which are fixedly inserted into the guide grooves of the lateral walls, determined width of wings which are extended upwards from the wing fixing portions and formed to bend toward the center of the mounting portion, respectively, and a determined width of cover which is provided in the range between one end of the separation prevention member and the wings.

12 Claims, 12 Drawing Sheets

TABLET COMPUTER

BACKGROUND OF THE INVENTION

1. Technical Field

The present invention relates to a tablet computer. Especially, the present invention relates to a table computer which has a mobile phone mounting portion formed so that a mobile phone may be mounted on the rear of the table computer, wherein the table computer is provided with a mobile phone separation prevention member allowing a mobile phone to be mounted on the mobile phone mounting portion of the table computer regardless of different width and thickness.

2. Description of the Related Art

Mobile electronic devices with large screens, i.e., tablet computers, have been recently widespread, and mobile phones have also become living necessaries. It is, therefore, often to carry large screen tablet computers along with mobile phones. However, carrying mobile phones and big size tablet computers separately causes inconvenience in using both of them. Korean Patent Application No. 10-2013-0062850 filed by the applicant on May 31, 2013, entitled "Tablet Computer" relates to a tablet computer having a mobile phone mounting portion formed in the rear thereof.

According to the application, a tablet computer is configured to include a mobile phone mounting portion which is formed in the rear of the tablet computer in a recessed manner so that a surface line of a mobile phone to be mounted is flush with another surface line of the rear of the tablet computer, has an entrance formed in a lateral direction, and has an elastic cover formed in an inwardly-protruding manner along the boundary formed between the rear of the tablet computer and the mobile phone mounting portion to elastically restrain the mounted mobile phone, a port which is formed in the mobile phone mounting portion and electrically connects the mobile phone mounted on the mobile phone mounting portion and the tablet computer to allow data communication to be performed between the mobile phone and the tablet computer, and an interface which performs a tethering connection from any one, which may communicate with an external network, among the mobile phone mounted in the mobile phone mounting portion and the tablet computer to the other through the port.

However, because, according to the application, the mobile phone mounting portion formed in the rear of the tablet computer is manufactured in a determined size, and the elastic cover is formed in a fixed size and is fixedly mounted on the mobile phone mounting portion, the size of a mobile phone to be mounted on the tablet computer has to correspond to that of the mobile phone mounting portion. Accordingly, when the size of a user's mobile phone fails to correspond to that of the mobile phone mounting portion of the tablet computer, it is disadvantageous to use the mobile phone and the table computer together.

Consequently, a tablet computer with a mobile phone mounting portion formed in the rear thereof is required that may allow a user's mobile phone to be mounted on the tablet computer regardless of the size of the user's mobile phone.

SUMMARY OF THE INVENTION

Accordingly, the present invention is applied to solve the above-mentioned disadvantage, and an objective of the present invention is to provide a tablet computer having a mobile phone mounting portion formed in the rear thereof wherein a mobile phone may be allowed to be mounted on the tablet computer regardless of the size of a user's mobile phone.

In order to achieve the objective, according to an aspect of the present invention, there is provided a tablet computer including a mobile phone mounting portion which has determined width and length, and is formed in the rear of the tablet computer in a recessed manner, guide grooves which are formed on both lateral walls of the mobile phone mounting portion in a longitudinal direction, and a separation prevention member which is fixedly inserted into the guide grooves and has width and length corresponding to those of the mobile phone mounting portion, characterized in that the separation prevention member includes wing fixing portions which are fixedly inserted into the guide grooves of the both lateral walls, determined width of wings which are extended from the wing fixing portions in an upward direction and are formed to bend toward the center of the mobile phone mounting portion, respectively, and a determined width of cover which is provided in the range between one end of the separation prevention member and the both wings.

DETAILED DESCRIPTION

Hereinafter, embodiments of the present invention are described in detain with reference to the accompanying drawings.

Figure 1:
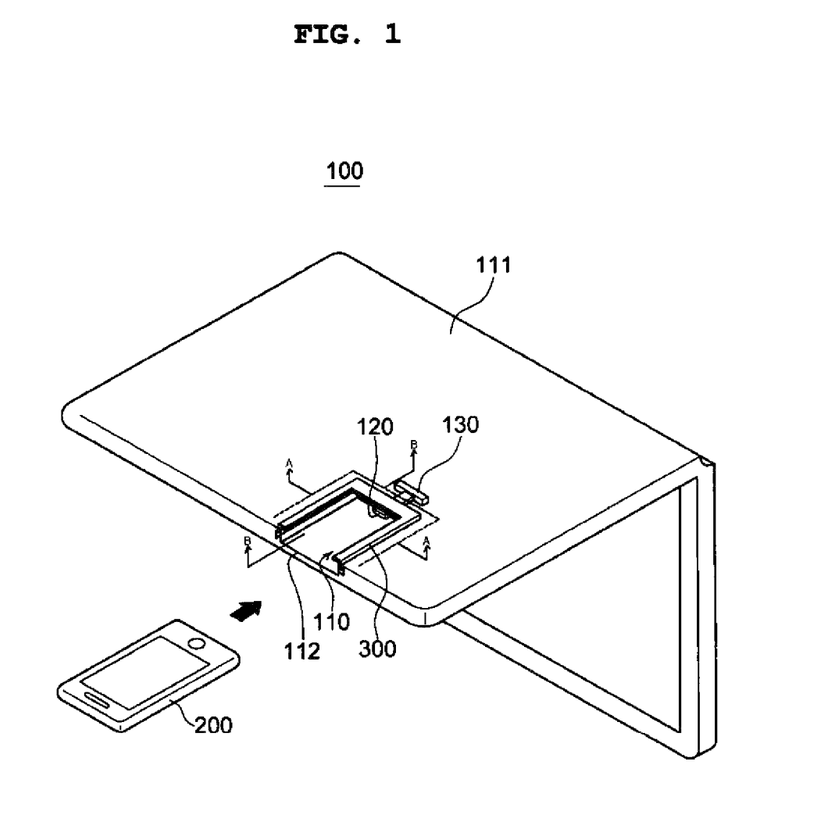
FIG. 1 illustrates a configuration of a tablet computer according to an embodiment of the present invention in a schematic view.
Figure 2A:
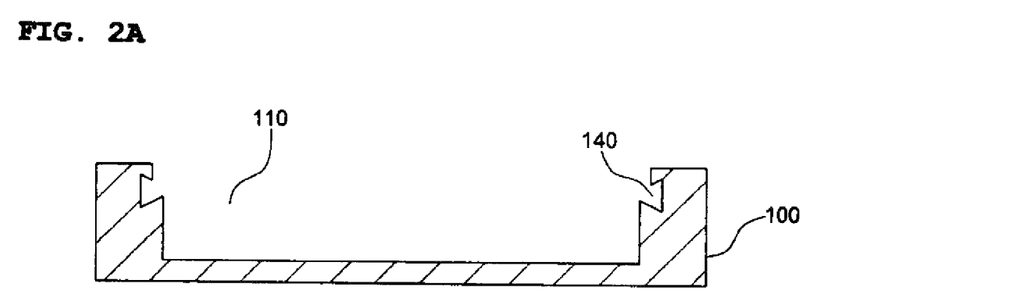
FIGS. 2A and 2B illustrate configurations of the tablet computer from which a separation prevention member is excluded in a schematic sectional view taken along line A-A and B-B in FIG. 1.
Figure 2B:
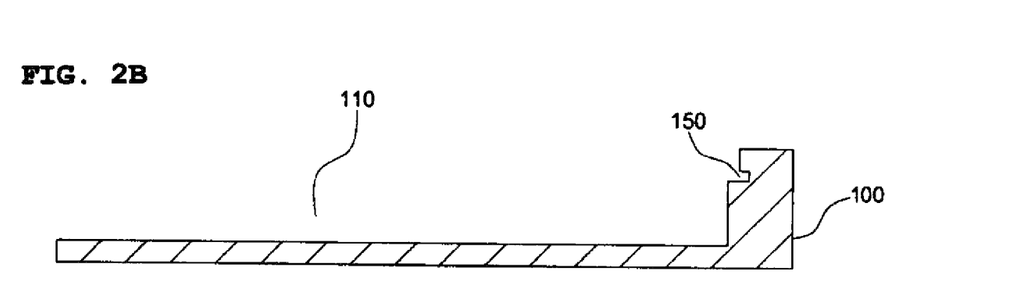
Figure 3A:
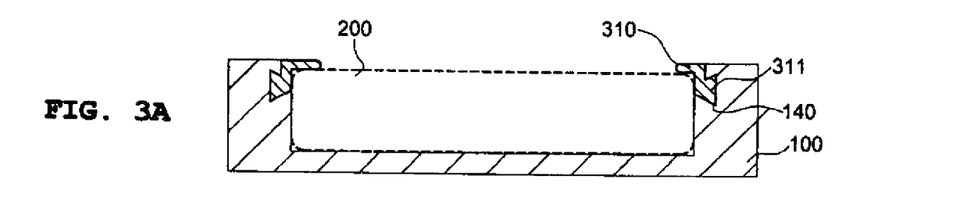
FIGS. 3A to 3C illustrate configurations of the tablet computer on which the separation prevention member and a mobile phone are mounted and an embodiment of the separation prevention member in a schematic sectional view taken along line A-A and B-B in FIG. 1.
Figure 3B:
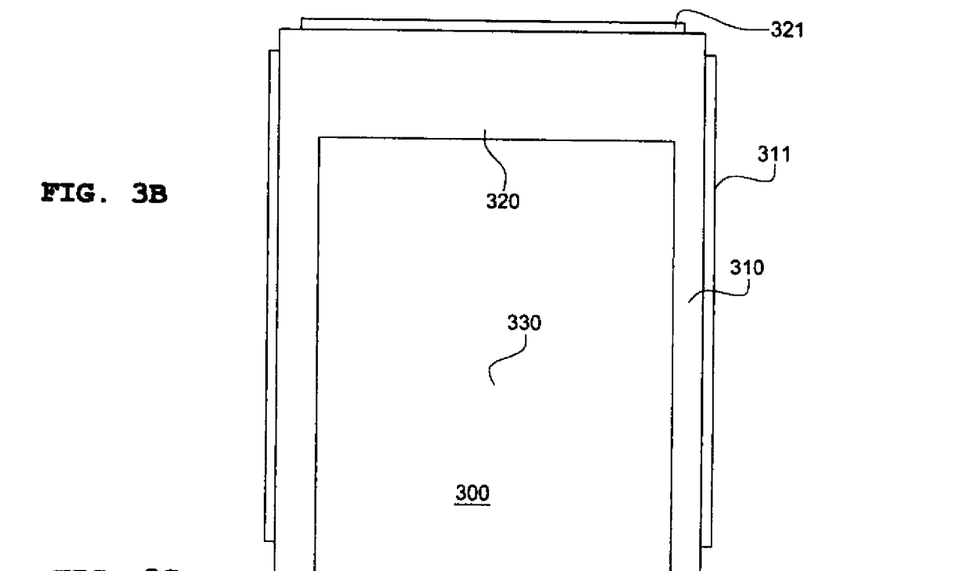
Figure 3C:
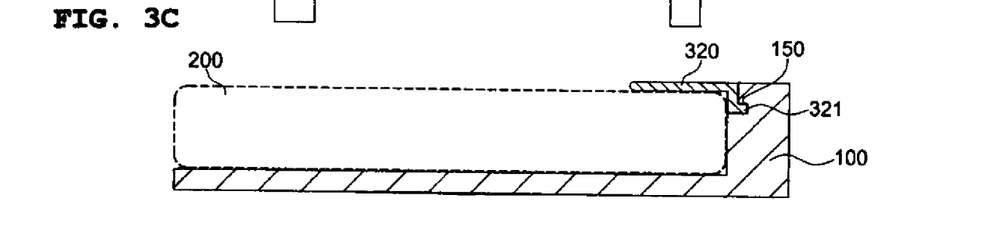

FIG. 1 illustrates a configuration of a tablet computer according to an embodiment of the present invention in a schematic view. Also, FIGS. 2A and 2B illustrate configurations of the tablet computer from which a separation prevention member is excluded in a schematic sectional view taken along line A-A and B-B in FIG. 1, and FIGS. 3A to 3C illustrate configurations of the tablet computer on which the separation prevention member and a mobile phone are mounted and an embodiment of the separation prevention member in a schematic sectional view taken along line A-A and B-B in FIG. 1. FIGS. 1 to 3 illustrate only major portions to understand the concepts of the present invention specifically, and thus various modifications of the drawings may be expected and the scope of the present invention is not limited to specific shapes shown in the drawings.

Referring to FIG. 1, a tablet computer 100 of the present invention includes a mobile phone mounting portion 110, a port 120, an interface 130, and a separation prevention member 300.

The mobile phone mounting portion 110 is an area in which a mobile phone 200 is mounted on the rear 111 of the tablet computer 100. Here, the rear of the tablet computer means a surface opposing a front surface in which a display window is formed. The mobile phone mounting portion 110 may be formed in the rear 111 of the tablet computer 100 in a recessed manner so that a space on which the mobile phone 200 is mounted is formed.

In addition, an entrance 112 of the mobile phone mounting portion 110 may be formed in a lateral direction of the tablet computer 100. Such a mobile phone mounting portion 110 may be formed to allow the mobile phone 200 to be slidingly inserted into the mounting portion from a lateral direction of the tablet computer 100.

The port 120 is formed in an inner end of the mobile phone mounting portion 110, and electrically connects the tablet computer 100 with the mobile phone 200 so that the computer and the phone may communicate with each other. The port 120 may connect to the interface 130 formed inside the tablet computer 100. In addition, although the port 120 may be formed in an inner end of the mobile phone mounting portion 110, the present invention is not limited thereto, and proper modifications may be performed under consideration of the position of a data port of a typical mobile phone 200 and the direction where the mobile phone 200 is inserted into the mobile phone mounting portion 110.

The tablet computer may be configured to supply electrical energy charged in any one battery among the mobile phone mounted on the mobile phone mounting portion 110 or the tablet computer 100 to the other battery through the port 120. Accordingly, electrical energy may be easily exchanged between the mobile phone 200 and the tablet computer 100, even in a case in which electrical energy fails to be supplied to the tablet computer or the mobile phone outside.

In addition, the mobile phone 200 mounted on the mobile phone mounting portion 110 is configured to receive electrical energy from the tablet computer 100 through the port 120, and thus a battery capacity of the mobile phone 200 may be led to be significantly reduced.

The interface 130 is formed inside the tablet computer 100 and connects to the port 120. The interface 130 may use any one, which has a communication module connecting an external network, e.g., 3rd Generation (3G), 4th Generation (4G), etc., provided by common carriers, of the tablet computer 100 or the mobile phone 200 to perform a tethering connection to the other one which does not have a communication module. For example, the interface 130 supports the table computer 100 to allow voice and video calls or text message communication to be performed in the tablet computer using the communication module in the mobile phone 200, in a case in which a communication module connecting to an external network is provided to the mobile phone 200 rather than the tablet computer 100. However, the interface 130 supports the mobile phone 200 to allow voice and video calls or text message communication to be performed in the mobile phone using the communication module in the tablet computer 100, in a case in which a communication module connecting to an external network is provided to the tablet computer 100 rather than the mobile phone 200.

In addition, in a case in which the mobile phone is a terminal that may run application programs, such as a smart phone, when the mobile phone is mounted on a tablet computer, the tablet computer may be configured to run the application programs stored in the mobile phone.

Furthermore, according to the embodiment of the present invention, when a mobile phone is mounted on a tablet computer, the tablet computer may be configured to have a mobile phone only mounted thereon, instead of providing a communication or power connection function between the tablet computer and the mobile phone.

Besides, according to the embodiment of the present invention, when a mobile phone is mounted on a tablet computer, the tablet computer may be configured to allow the mobile phone to use power therefrom, instead of providing communication connection function between the tablet computer and the mobile phone.

The separation prevention member 300 supports the mobile phone 200 mounted on the mobile phone mounting portion 110 to prevent the mounted mobile phone from being separated from the mobile phone mounting portion, and allows the mobile phone 200 to be easily inserted into the mobile phone mounting portion 110.

Referring to FIGS. 2A and 2B, FIG. 2A is a schematic view taken along line A-A in FIG. 1. Guide grooves 140 are formed in determined positions of both lateral walls of the mobile phone mounting portion 110 formed in the tablet computer 100 in a recessed manner so that both ends of the separation prevention member 300 are fixedly inserted into the guide grooves. FIG. 2B is a schematic view taken along line B-B in FIG. 1. A groove 150 is formed in a determined position of the inner end wall of the mobile phone mounting portion 110 formed in the tablet computer 100 in a recessed manner so that an end of the separation prevention member 300 is inserted into the grooves.

Referring to FIGS. 3A to 3C, FIG. 3A illustrates a configuration of the tablet computer 100 in a state in which the mobile phone 200 is mounted on the mobile phone mounting portion 110 in a schematic sectional view taken along line A-A in FIG. 1. As shown in FIG. 3A, Wing fixing portions 311 of the separation prevention member 300 are inserted into the guide grooves 140 on the both later walls of the mobile phone mounting portion 110, and thus the separation prevention member 300 is inserted into the mobile phone mounting portion 110 of the tablet computer 100. The separation prevention member is configured to include determined length of wings 310 which are formed to be extended from ends of the wing fixing portions 311 toward the center of the mobile phone mounting portion 110, respectively. When the mobile phone 200 is mounted on the mobile phone mounting portion 110, the wings 310 of the separation prevention member 300 are configured to cover upper edges of the mobile phone 200, thereby preventing the mobile phone 200 from being separated from the mobile phone mounting portion 110.

Referring to FIG. 3B, FIG. 3B illustrates a configuration of the separation prevention member 300 fixedly inserted into lateral walls and the inner end wall of the mobile phone mounting portion 110 in a schematic top view. The separation prevention member is configured to include wings 310 which have width and length corresponding to those of the mobile phone mounting portion 110 and are formed in both lateral walls of the separation prevention member, wing fixing portions 311 which are formed to protrude outwards from the wings, respectively, a determined width of cover 320 which is formed in a shape that connects between ends of the wings 310, and a cover fixing portion 321 which is formed to protrude outwards from the cover 320. The separation prevention member 300 may be configured with an elastic material. The separation prevention member 300 is coupled to the tablet computer 100 in such a manner that the wing fixing portions 311 of the separation prevention member 300 are pushed and inserted into the guide grooves 140 on the both lateral walls of the mobile phone mounting portion 110, and then the cover fixing portion 321 is inserted into a groove 150 on the inner end wall of the mobile phone mounting portion 110.

Referring to FIG. 3C, the cover fixing portion 321 of the separation prevention member 300 is inserted into the groove 150 formed in the inner end wall of the mobile phone mounting portion 110, and thus the separation prevention member 300 is coupled to the mobile phone mounting portion 110 of the tablet computer 100, and when the mobile phone 200 is mounted on the mobile phone mounting portion 110, the cover 320 prevents the mobile phone from being separated from the tablet computer by covering a part of the mobile phone. Preferably, the cover 320 of the separation prevention member 300 has a width equal to or larger than the width of the wings 310. The cover 320 is formed to have a width larger than the width of the wings 310, and thus stability may be more provided when the mobile phone 200 is mounted on the mobile phone mounting portion 110.

Figure 4A:
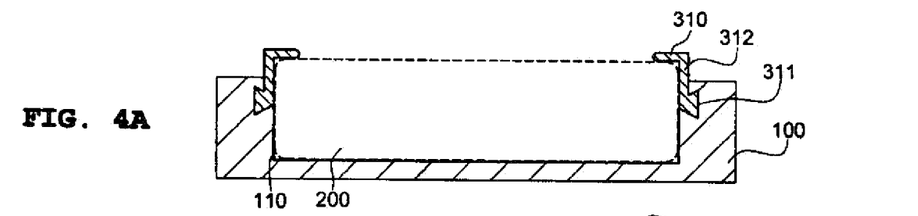
FIGS. 4A to 4C illustrate configurations of the tablet computer on which the separation prevention member and a mobile phone are mounted and another embodiment of the separation prevention member in a schematic sectional view taken along line A-A and B-B in FIG. 1.
Figure 4B:
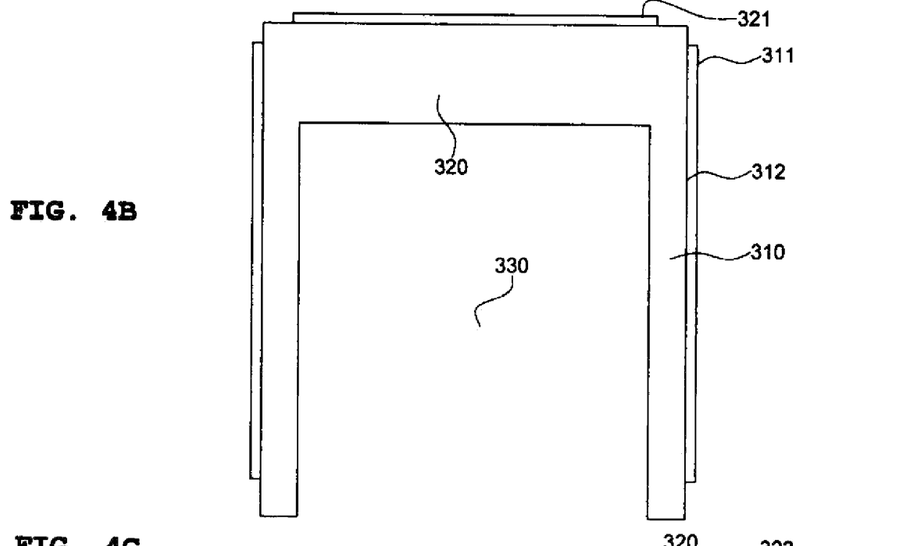
Figure 4C:
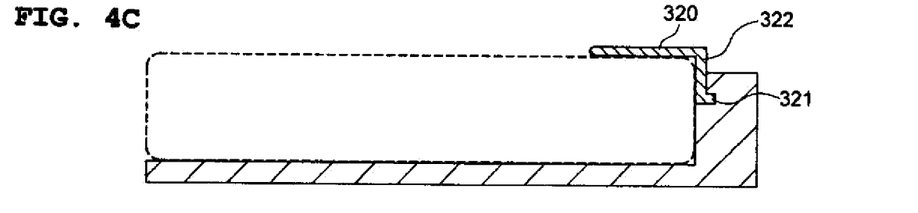

FIGS. 4A to 4C illustrate configurations of the tablet computer on which the separation prevention member and a mobile phone are mounted and another embodiment of the separation prevention member in a schematic sectional view taken along line A-A and B-B in FIG. 1.

Referring to FIG. 4A, a mobile phone 200 mounted on a mobile phone mounting portion 110 of the tablet computer 100 has a height higher than the height of lateral walls of the mobile phone mounting portion 110. The separation prevention member 300 is configured to include wing fixing portions 311 which are inserted into guide grooves 140 formed in both lateral walls of the mobile phone mounting portion 110, respectively, determined length of wing supports 312 which are formed to be extended from the wing fixing portions 311 in an upward direction, respectively, and determined width of wings 310 which are formed to bend from ends of the wing supports 312 toward the center of the mobile phone mounting portion 110, respectively.

FIG. 4B illustrates the separation prevention member 300 with the above-mentioned configuration in a schematic top view.

In addition, referring to FIG. 4C, the separation prevention member is configured to include a cover fixing portion 321 which is inserted into a groove 150 formed in the inner end wall of the mobile phone mounting portion 110, a determined length of cover support 322 which is formed to be extended from the cover fixing portion 321 in an upward direction, and a determined width of cover 320 which is formed to bend from an end of the cover support 322 toward an entrance 112 of the mobile phone mounting portion 110.

Figure 5A:
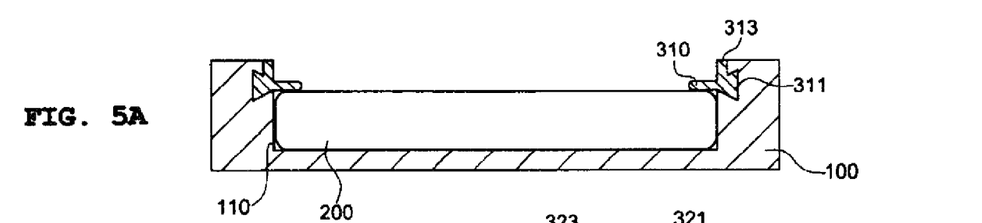
FIGS. 5A to 5C illustrate configurations of the tablet computer on which the separation prevention member and a mobile phone are mounted and a further embodiment of the separation prevention member in a schematic sectional view taken along line A-A and B-B in FIG. 1.
Figure 5B:
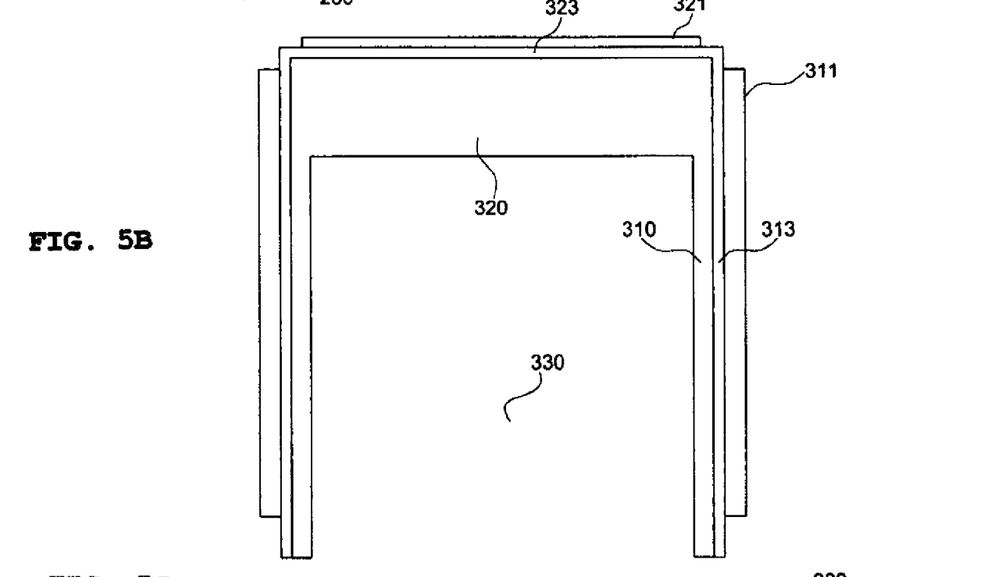
Figure 5C:
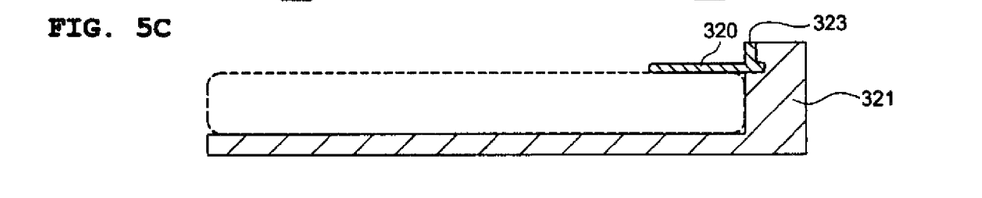

FIGS. 5A to 5C illustrate configurations of the tablet computer on which the separation prevention member and a mobile phone are mounted and a further embodiment of the separation prevention member in a schematic sectional view taken along line A-A and B-B in FIG. 1.

Referring to FIG. 5A, a mobile phone 200 mounted on a mobile phone mounting portion 110 of the tablet computer 100 has a height lower than the height of lateral walls of the mobile phone mounting portion 110. The separation prevention member 300 is configured to include wing fixing portions 311 which are inserted into guide grooves 140 formed in both lateral walls of the mobile phone mounting portion 110, respectively, determined length of wing supports 313 which are formed to be extended from the wing fixing portions 311 in an upward direction, respectively, and determined width of wings 310 which are formed to bend from lower ends of the wing supports 313 toward the center of the mobile phone mounting portion 110, respectively. The wing supports 313 are configured to strengthen rigidity of the wings 310.

FIG. 5B illustrates the separation prevention member 300 with the above-mentioned configuration in a schematic top view.

In addition, referring to FIG. 5C, the separation prevention member is configured to include a cover fixing portion 321 which is inserted into a groove 150 formed in the inner end wall of the mobile phone mounting portion 110, a determined length of cover support 323 which is formed to be extended from the cover fixing portion 321 in an upward direction, and a determined width of cover 320 which is formed to bend from a lower end of the cover support 323 toward an entrance 112 of the mobile phone mounting portion 110.

Figure 6A:
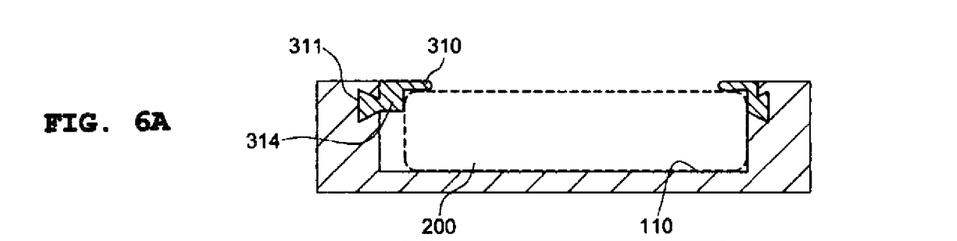
FIGS. 6A to 6C illustrate configurations of the tablet computer on which the separation prevention member and a mobile phone are mounted and a further embodiment of the separation prevention member in a schematic sectional view taken along line A-A and B-B in FIG. 1.
Figure 6B:
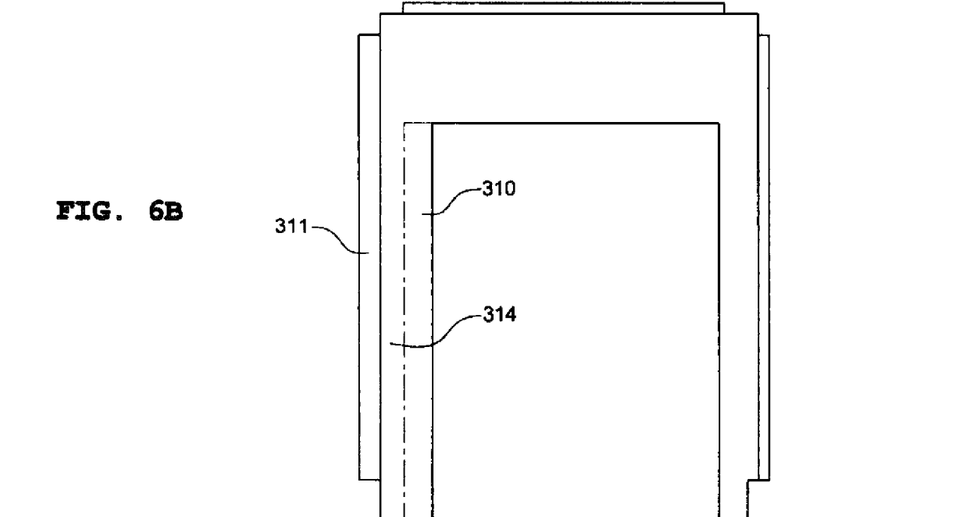
Figure 6C:
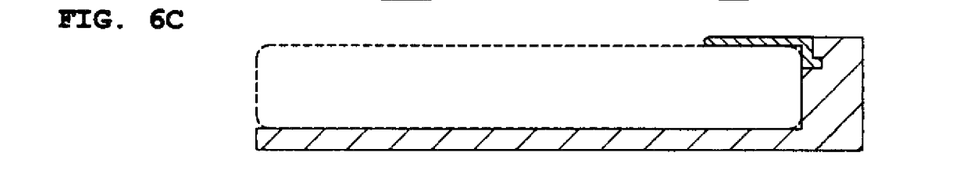

FIGS. 6A to 6C illustrate configurations of the tablet computer on which the separation prevention member and a mobile phone are mounted and a further embodiment of the separation prevention member in a schematic sectional view taken along line A-A and B-B in FIG. 1.

Referring to FIG. 6A, a mobile phone 200 mounted on a mobile phone mounting portion 110 of the tablet computer 100 has a width narrower than the width of the mobile phone mounting portion 110. The separation prevention member 300 is configured to include wing fixing portions 311 which are inserted into guide grooves 140 formed in both lateral walls of the mobile phone mounting portion 110, respectively, a determined width of wing 310 which is formed to bend from one of the wing fixing portions 310 toward the center of the mobile phone mounting portion 110, a determined width of spacer 314 which is formed to be extended from the other one of the wing fixing portions 310 toward the center of the mobile phone mounting portion 110, and another determined width of wing 310 which is formed to be extended from an end of the spacer 314. Because the width of the mobile phone 200 is narrower than that of the mobile phone mounting portion 110, the spacer 314 is configured to fill a gap caused by the difference between the widths of the mobile phone and the mounting portion, and thus the mobile phone 200 is securely mounted on the mobile phone mounting portion 110.

Referring to FIG. 6B, the separation prevention member 300 is configured to include a determined width of spacer 314 which is formed to be extended from the left wing fixing portion 311 in an inward direction, and a determined width of wing 310 which is formed to be extended from an end of the spacer 314 in an inward direction.

FIG. 6C is omitted because having the same description as FIG. 3C.

Figure 7A:
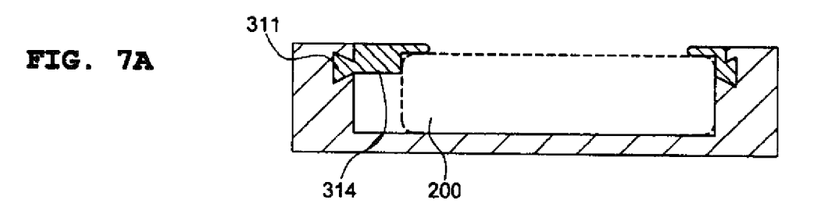
FIGS. 7A to 7C illustrate configurations of the tablet computer on which the separation prevention member and a mobile phone are mounted and a further embodiment of the separation prevention member in a schematic sectional view taken along line A-A and B-B in FIG. 1.
Figure 7B:
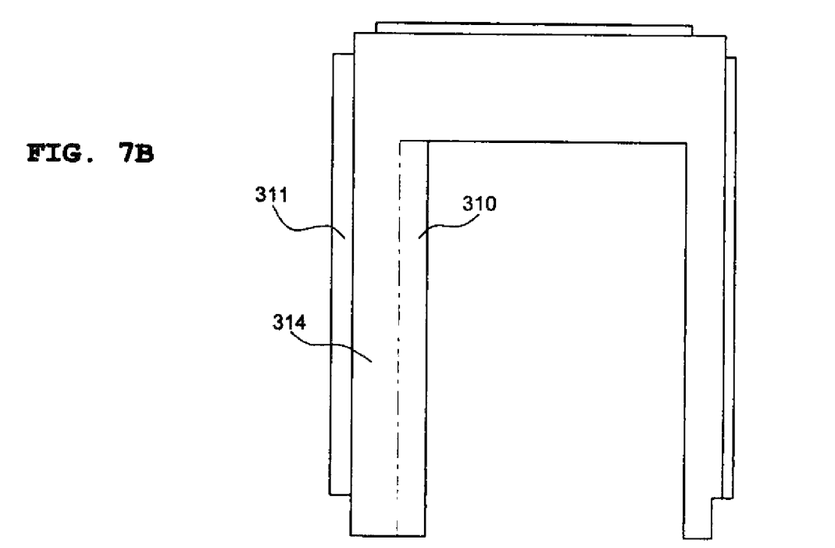
Figure 7C:
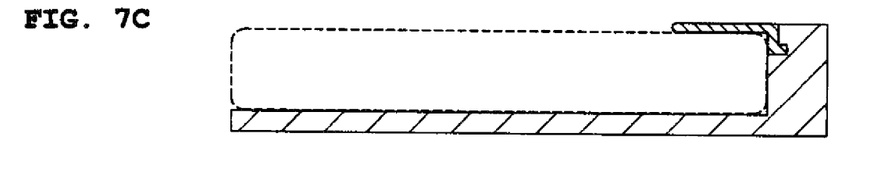

FIGS. 7A to 7C illustrate configurations of the tablet computer on which the separation prevention member and a mobile phone are mounted and a further embodiment of the separation prevention member in a schematic sectional view taken along line A-A and B-B in FIG. 1.

FIGS. 7A to 7C illustrate an embodiment of a case in which a mobile phone 200 has a width much narrower than the mobile phone mounting portion 110, in comparison with FIGS. 6A to 6C. The description of each reference numeral is omitted because the each reference numeral is the same as that in FIGS. 6A to 6C.

Figure 8A:
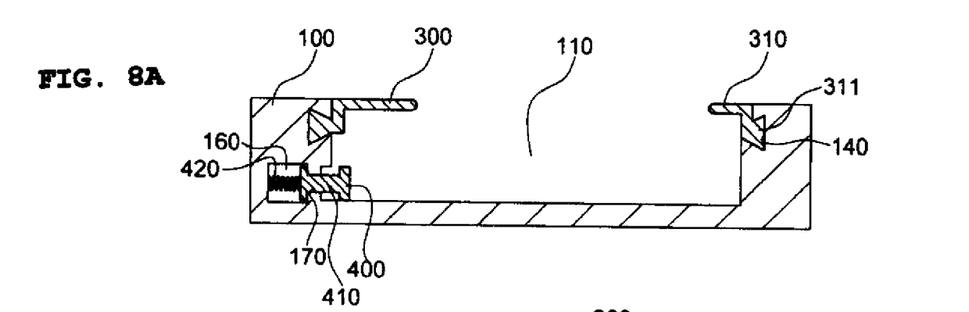
FIGS. 8A to 8C illustrate configurations of the tablet computer according to another embodiment of the present invention in a schematic view.
Figure 8B:
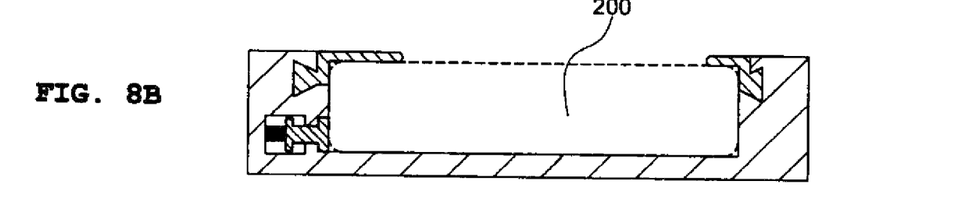
Figure 8C:
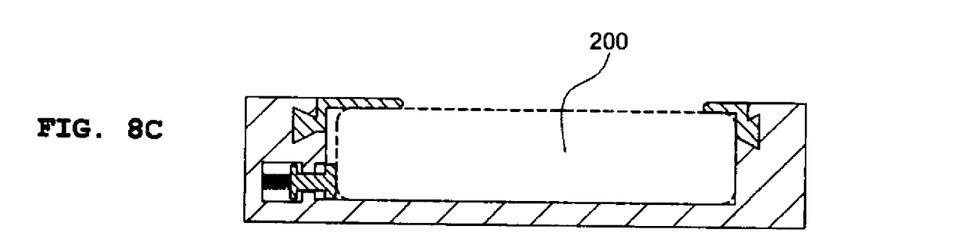

FIGS. 8A to 8C illustrate configurations of the tablet computer according to another embodiment of the present invention in a schematic view.

Referring to FIG. 8A, the tablet computer of the present invention is configured to include a mobile phone mounting portion 110 which has determined width and length, and is formed in the rear of the tablet computer 100 in a recessed manner, guide grooves 140 which are formed in both lateral walls of the mobile phone mounting portion 110 and are used to receive wing fixing portions 311 of a separation prevention member 300, a groove which is formed in the inner end wall of the mobile phone mounting portion 110 to receive a cover fixing portion of the separation prevention member 300, a rod guide 170 which is formed to face outwards from one lateral wall of the mobile phone mounting portion 110, a chamber 160 which receives a spring member, a spring member 420 which is elastically received in the chamber 160, a determined length of rod 410 which is fixedly mounted on an end of the spring member 420 and disposed in the rod guide 170, and a mobile phone pressurization member 400 which is formed in an end of the rod 410.

Referring to FIG. 8B, the width of the mobile phone 200 corresponds to that of the mobile phone mounting portion 110. When the mobile phone 200 is mounted on the mobile phone mounting portion, the rod 410 presses the spring member 420 and is pushed toward the chamber 160, and after that, the spring pressurization member 400 applies pressure to the side of the mobile phone 200.

As shown in FIG. 8C, in a case in which the width of the mobile phone 200 is narrower than that of the mobile phone mounting portion 110, the mobile phone pressurization member 400 is slightly pushed toward the chamber 160 and applies pressure to the side of the mobile phone 200, so that the mobile phone is mounted.

Figure 9:
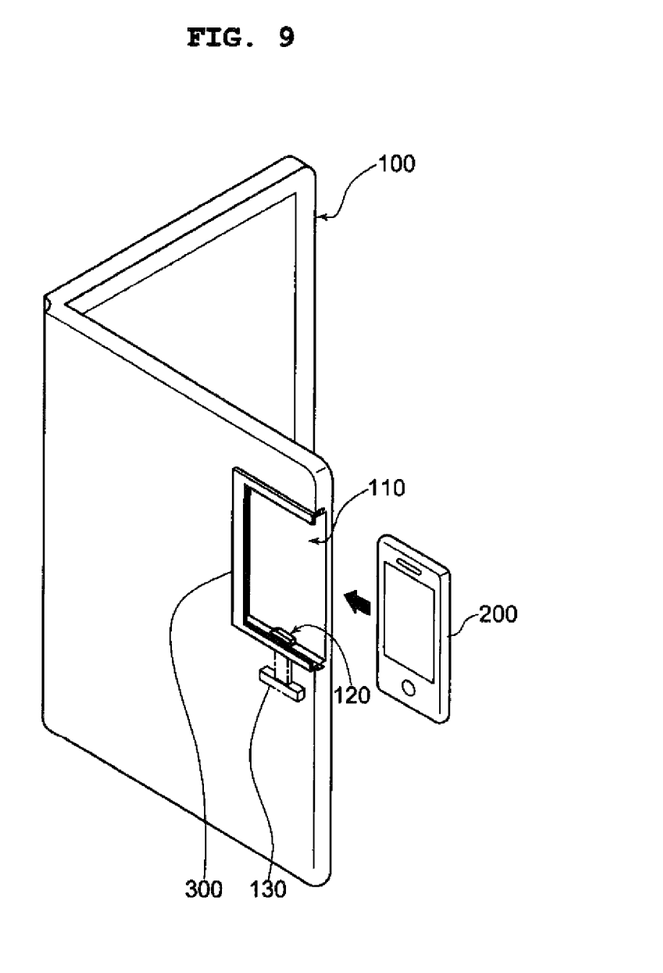
FIG. 9 illustrates a configuration of the tablet computer according to a further embodiment of the present invention in a schematic view.

FIG. 9 illustrates a configuration of the tablet computer according to a further embodiment of the present invention in a schematic view.

As shown in FIG. 9, a mobile phone mounting portion 110 is formed in one section of the rear of the tablet computer 100 with one foldable line, and a separation prevention member 300 is inserted into the mobile phone mounting portion 110.

Figure 10:
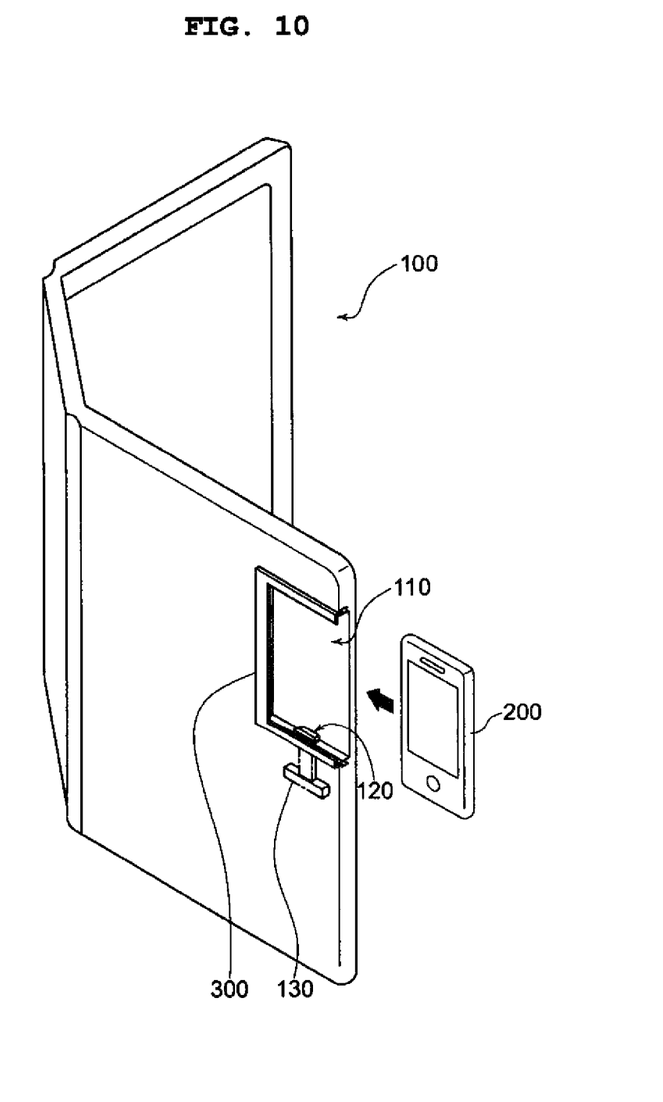
FIG. 10 illustrates a configuration of the tablet computer according to a further embodiment of the present invention in a schematic view.

FIG. 10 illustrates a configuration of the tablet computer according to a further embodiment of the present invention in a schematic view.

As shown in FIG. 10, a mobile phone mounting portion 110 is formed in one section of the rear of the tablet computer 100 with two foldable lines, and a separation prevention member 300 is inserted into the mobile phone mounting portion 110.

Figure 11:
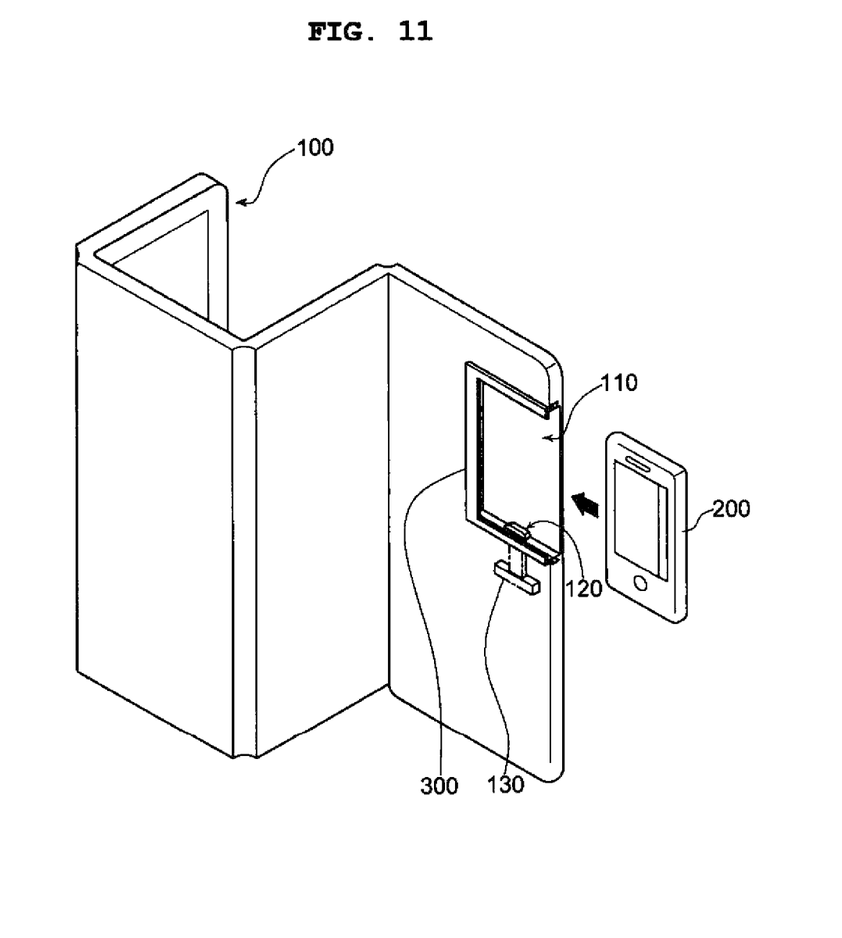
FIG. 11 illustrates a configuration of the tablet computer according to a further embodiment of the present invention in a schematic view.

FIG. 11 illustrates a configuration of the tablet computer according to a further embodiment of the present invention in a schematic view.

As shown in FIG. 11, a mobile phone mounting portion 110 is formed in one section of the rear of the tablet computer 100 with three foldable lines, and a separation prevention member 300 is inserted into the mobile phone mounting portion 110.

Figure 12:
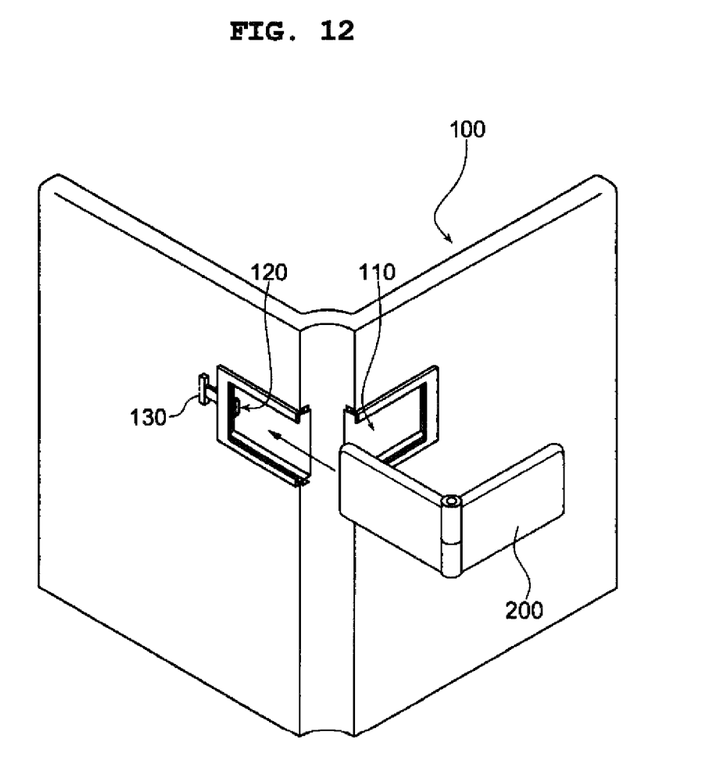
FIG. 12 illustrates a configuration of the tablet computer according to a further embodiment of the present invention in a schematic view.

FIG. 12 illustrates a configuration of the tablet computer according to a further embodiment of the present invention in a schematic view.

As shown in FIG. 12, in the tablet computer 100 with a foldable line, a flip-type mobile phone mounting portion 110 is formed in both sections of the rear of the tablet computer to be divided from the foldable line, and a separation prevention member 300 is inserted into the flip-type mobile phone mounting portion 110.

According to the present invention, a tablet computer having a mobile phone mounting portion formed in the rear thereof has an advantage that a user's mobile phone may be easily and safely mounted on the tablet computer regardless of the size of the user's mobile phone.

The above-mentioned embodiments of the present invention are only part of various embodiments of the present invention. It is apparent that the protective scope of the present invention includes various embodiments included within the scope of technical ideas of a tablet computer of the present invention including a mobile phone mounting portion which has determined width and length, and is formed in the rear of the tablet computer in a recessed manner, guide grooves which are formed in both lateral walls of the mobile phone mounting portions to fixedly receive a separation prevention member, respectively, and a separation prevention member which consists of determined width of wings formed in the both sides of the member, projecting wing fixing portions formed in outer sides of the wings to be inserted into the guide grooves, respectively, and a determined width of cover extended between one end of the separation prevention member and the both wings.

The invention claimed is:

1. A tablet computer comprising:

a mobile phone mounting portion which has predetermined width and length, and is formed, in the rear of the tablet computer in a recessed manner, by three walls including two lateral walls and an inner wall connecting the two lateral walls on an inner side so that when a mobile phone is mounted on the mobile mounting portion, a display portion and manipulation portion of the mobile phone are exposed and the mobile phone can be slidably mounted thereon;

guide grooves which are formed in predetermined positions of the two lateral walls of the mobile phone mounting portion in a longitudinal direction in a recessed manner along lengths of the two lateral walls; and a separation prevention member which is fixedly inserted into the guide grooves and has a width and length corresponding to those of the mobile phone mounting portion, wherein the separation prevention member comprises:

wing fixing portions which protrude outwardly to be fixedly inserted into the guide grooves of the two lateral walls, respectively;

wing portions having a predetermined width which are respectively extended to the wing fixing portions in an upward direction, and are bent toward the center of the mobile phone mounting portion, thereby partially covering upper surfaces of the two lateral sides of the mobile phone in a longitudinal direction; and a cover portion having a predetermined width which interconnects the wing portions of the two lateral sides at an end portion of the separation prevention member and partially covers upper surfaces of the lower portion of the mobile phone.

2. The tablet computer according to claim 1, wherein the tablet computer further comprises a port which is formed in the inner end wall of the mobile phone mounting portion to allow data communication to be performed between a mobile phone and the mobile phone mounting portion, when the mobile phone is mounted on the mobile phone mounting portion.

3. The tablet computer according to claim 2, wherein the mobile phone mounted on the mobile phone mounting portion is supplied with electrical energy from the tablet computer through the port.

4. The tablet computer according to claim 3, wherein the tablet computer has at least one foldable line.

5. The tablet computer according to claim 2, wherein the tablet computer has at least one foldable line.

6. The tablet computer according to claim 1, wherein the separation prevention member further comprises wing supports which are disposed between the wing fixing portions and the wings, and are formed to be extended from the wing fixing portions in an upward direction.

7. The tablet computer according to claim 6, wherein the tablet computer has at least one foldable line.

8. The tablet computer according to claim 1, wherein the separation prevention member further comprises a spacer which is disposed between one of the wing fixing portions and the wing, and is formed to be extended from the one of the wing fixing portions toward the center of the mobile phone mounting portion.

9. The tablet computer according to claim 8, wherein the tablet computer has at least one foldable line.

10. The tablet computer according to claim 1, wherein the tablet computer further comprises a mobile phone pressurization member protruding from one lateral wall of the mobile phone mounting portion by means of a spring member.

11. The tablet computer according to claim 10, wherein the tablet computer has at least one foldable line.

12. The tablet computer according to claim 1, wherein the tablet computer has at least one foldable line.

* * * * *